United States Patent [19]
Gilbu

[11] 3,770,541
[45] Nov. 6, 1973

[54] METHOD FOR PRODUCING TUBES OF REINFORCED SETTING PLASTIC MATERIAL

[75] Inventor: Agnar Gilbu, Sandefjord, Norway

[73] Assignee: Vera Fabrikker A/S, Sandefjord, Norway

[22] Filed: Feb. 12, 1971

[21] Appl. No.: 114,890

[30] Foreign Application Priority Data
Feb. 18, 1970 Norway.................................. 587/70

[52] U.S. Cl................. 156/173, 156/171, 156/178, 156/192, 117/111 R
[51] Int. Cl............................................. B29d 23/12
[58] Field of Search.................... 156/184, 187, 188, 156/192, 171, 169, 143, 195, 178, 443, 446, 425, 427, 426, 428; 138/140, 141, 143, 144

[56] References Cited
UNITED STATES PATENTS

| | | | |
|---|---|---|---|
| 2,862,524 | 12/1958 | Smith............................ | 156/195 X |
| 2,525,469 | 10/1950 | Anderson....................... | 156/192 X |
| 2,771,387 | 11/1956 | Kleist............................ | 161/141 |
| 2,758,630 | 8/1956 | Hodge........................... | 161/143 X |
| 3,575,782 | 4/1971 | Hansen.......................... | 161/141 |
| 2,786,789 | 3/1957 | Carlson.......................... | 161/143 |
| 3,430,543 | 3/1969 | Cunningham.................. | 156/195 |
| 2,235,630 | 3/1941 | Fischer.......................... | 156/184 |
| 2,744,041 | 5/1956 | Balchen......................... | 161/143 |

*Primary Examiner*—Ralph S. Kendall
*Attorney*—Cushman, Darby & Cushman

[57] ABSTRACT

A tube is made by supporting a web of fibres on a series of juxtaposed strands which, impregnated in a setting plastic material, are wound on to a mandrel to form the tube and its reinforcement.

2 Claims, 1 Drawing Figure

3,770,541
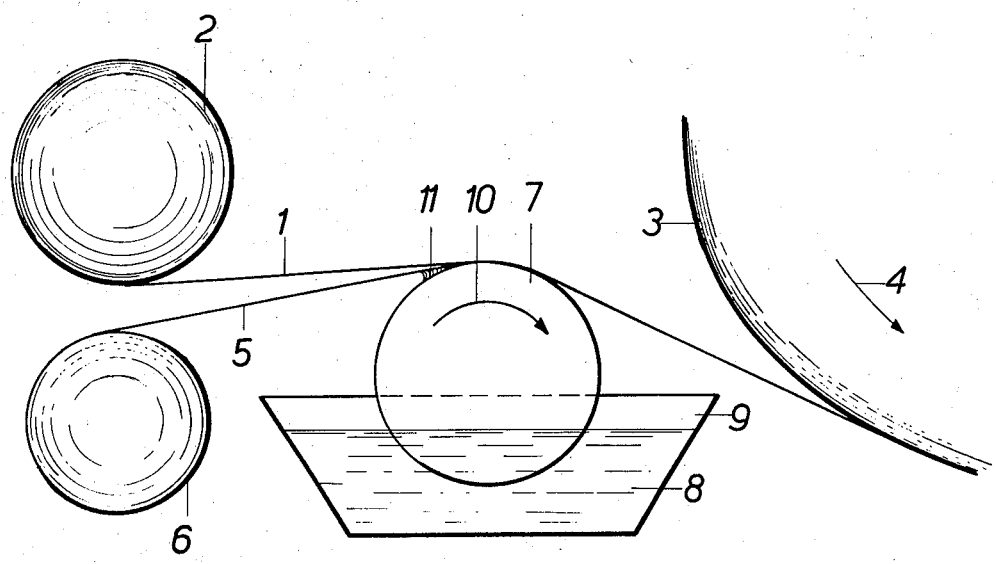

METHOD FOR PRODUCING TUBES OF REINFORCED SETTING PLASTIC MATERIAL

The present invention relates to a method of producing tubes of reinforced setting plastic material, where the reinforcement consists of uniformly distributed fibre web using a rotating mandrel.

Reinforcement webbing with unorientated fibre is usually bonded by a binder which is dissolved in the setting plastic material, for example, polyester. The dissolution is very rapid and has led to the production of setting plastic articles where the webbing reinforcement is applied in dry state. In an industrial process for the production of tubes, this is a disadvantage, however. In the industrial production of tubes, for example, strand reinforcement only has been used previously, the so-called roving. These strands are spun from continuous fibres and need no binder, and polyester can therefore be applied before the strands are introduced into the construction mandrel.

The present invention relates to a method which permits application of polyester to a fibre web, which is optionally bonded by a binder which dissolves in the setting plastic material prior to the web being introduced into the construction mandrel. The reinforcement web may then be introduced already impregnated by the setting plastic material, so that both reinforcement and setting plastic material are introduced to the mandrel simultaneously.

This is achieved by means of a method for producing tubes of reinforced setting plastic material where the reinforcement consists of the uniformly distributed fibre web and continuous strands, using a rotating mandrel and with simultaneous introduction of a web belt and strands, and it is characterized in that the web belt is forwarded to the mandrel supported by a web of juxtaposed reinforcing strands, that both web belt and strands are soaked with setting plastic material prior to being wound onto the mandrel. The reinforcing web and roving is supplied with setting plastic by means of a roller which is immersed in a vessel containing setting plastic material and the speed of the roller is controlled, so that the amount of setting plastic applied is controlled by an alteration in speed of the roller, the reinforcing material being passed to the roller above the bath.

The conventional method in web reinforcement in the form of a belt is to wet the said reinforcement with polyester by conveying it over rollers or the like into a bath of polyester. With webs which consist of unorientated fibres bonded by a polyester-soluble binder, such a method cannot be used since the web disintegrates rapidly and will dissolve and fall apart in the actual bath. In the method according to the invention, the juxtaposed reinforcement strands are disposed beneath the web, from the roller where the web and roving is soaked with setting plastic material, to the winding location. In this manner, it is of no significance that the web is dissolved into separate fibres by the setting plastic material. A further advantage achieved by the method according to the invention is that the strands are outside the web reinforcement on the finished, wound reinforcement. This prevents the web reinforcement from sagging on the mandrel which otherwise occurs since the setting of the polyester requires a certain period of time.

An apparatus for carrying out the method is characterized by a vessel for liquid setting plastic and a variable speed roller in connection with the vessel, said roller having a part of its periphery immersed in setting plastic material and, with the free part of its periphery, adapted to bear against the reinforcing material which is introduced to a mandrel for construction of a tube of solid plastic material.

The invention is further explained in the following by means of the drawing which illustrates in diagram form the introduction of reinforcing web and reinforcing strands. The reinforcing web 1, which consists of unorientated fibres which are optionally bonded with a binder which is dissolved in the setting plastic material, is forwarded from a storage roll 2 and is wound onto a mandrel 3 which rotates in the direction of the arrow 4. The reinforcing strands 5 are forwarded from a storage roll 6 and pass together with the fibre web 1 into the mandrel 3. Prior to being introduced onto the mandrel, the web and roving pass over a variable speed roller 7 which is which is immersed in a bath of setting plastic material 8 in a vessel 9. The roller rotates in the direction of the arrow 10 and by imparting a greater speed to the periphery of the roller than the speed with which the materials 1 and 5 are drawn onto the mandrel, a pressure front 11 of polyester is built up which is drawn up from the bath 8 to the reinforcing material. The faster the roller rotates in relation to the speed of feed of the materials 1, the greater amount of polyester is supplied to the reinforcing materials.

Having described my invention, I claim:

1. A method for the production of tubes comprising: impregnating a running fibrous web with a liquid settable plastic material, the web being constructed of unoriented fibers bonded together with a binder soluble in the settable plastic material; supporting the impregnated web on a plurality of parallel running reinforcement strands disposed below and in engagement with the impregnated web to thereby prevent disintegration of the web and winding the supported web and strands simultaneously about a rotating mandrel such that the strands lie outside the web on the mandrel.

2. A method as in claim 1 including feeding the fibrous web and the strands to the upper surface of a rotating horizontal roller with the strands being disposed beneath and in contact with the roller, the roller dipping into a bath of the plastic material and thereby effecting the impregnating of the web, and forwarding the impregnating web and strands in engagement with each other from the roller to the rotating mandrel.

* * * * *